United States Patent Office 3,521,305
Patented July 21, 1970

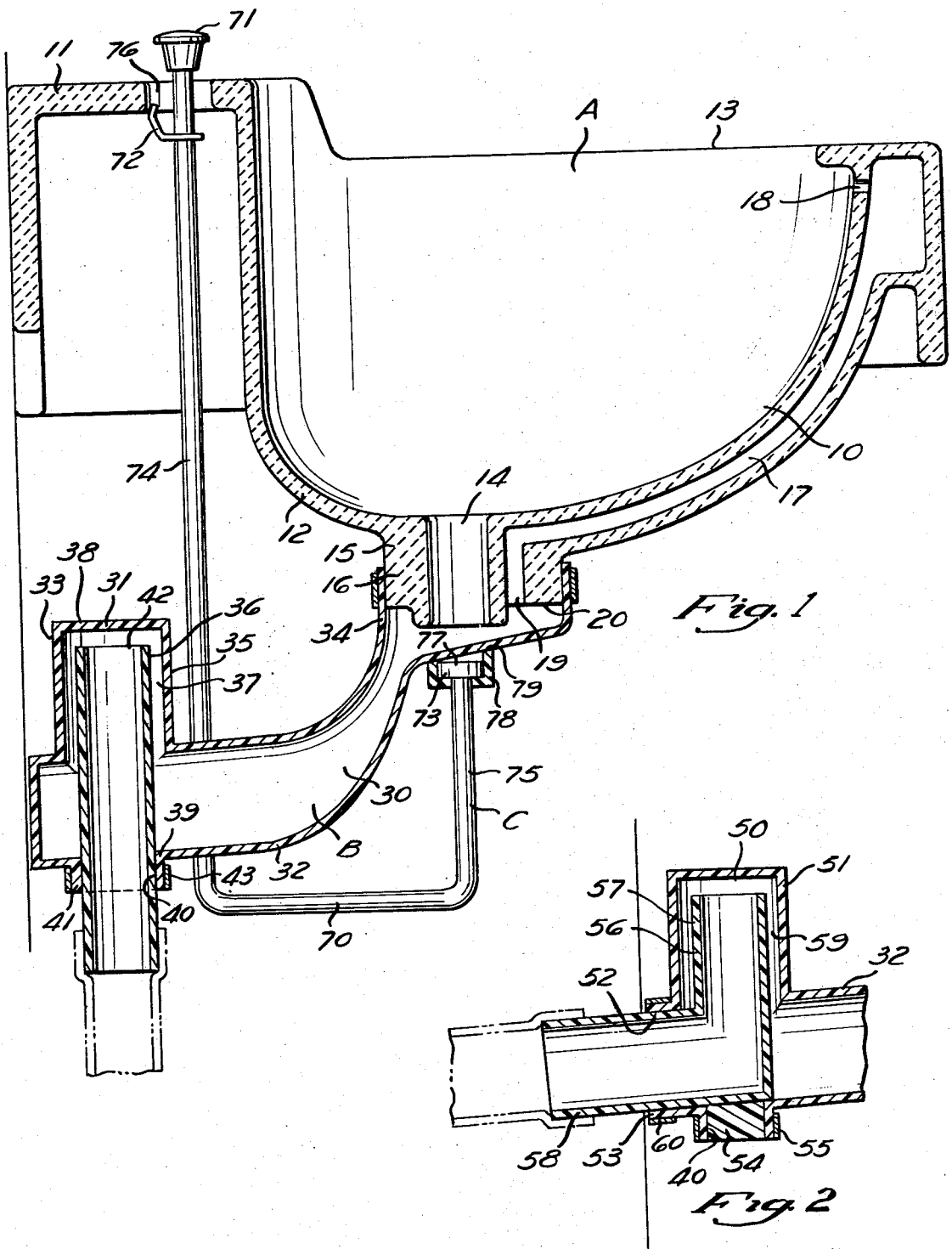

---

3,521,305
DEFORMABLE DRAINPIPE AND TRAP AND A STOPPER MEANS FOR A PLUMBING FIXTURE
Howard A. Fulton and Vaughn D. Flinner, Big Prairie, Ohio, assignors to Mansfield Sanitary, Inc.
Filed Aug. 9, 1967, Ser. No. 659,368
Int. Cl. A47k 1/14; E03c 1/22
U.S. Cl. 4—203
8 Claims

ABSTRACT OF THE DISCLOSURE

A plumbing drainpipe and water seal trap embodied therein made of a deformable solvent resistant plastic material for a trapless lavatory bowl having the drainpipe ends, respectively, connected to the bowl discharge outlet and a vertical or horizontal soil pipe inlet and having the wall portion of said drainpipe adjacent said bowl discharge outlet in combination with a waste water control unit of said bowl comprising a stopper for said bowl.

---

Applicants present the above abstract in compliance with the Rules of Practice in patent cases published Oct. 25, 1966, and in consideration of the representation set forth therein that the above statement is not intended to define the invention nor limit the scope.

BACKGROUND

Field of invention

This invention relates to the art of sanitary plumbing systems and more particularly to the field of deformable waste water disposal drainpipes and water seal traps for use in such systems for connecting the discharge outlets of plumbing fixtures with inlet soil pipes.

Description of the prior art

The prior art with which we are familiar in the sanitary plumbing field that relates to waste water disposal drainpipes and traps for lavatory bowls is the long-used metallic, rigid type tube or pipe usually made of lead or copper. The disadvantages in its use over the deformable plastic waste water disposal drainpipe and trap of the present invention include the higher cost of the drainpipe and trap material and a higher labor cost for the installation thereof, as well as the inability to use a portion of such drainpipe wall as an element of the lavatory bowl discharge stopper.

SUMMARY

In contrast with the prior art in the plumbing field of waste water disposal drainpipes and water seal traps, the present invention avoids the disadvantages found in such art in the following respects, among others: The drainpipe and the trap of the present invention are manufactured as an integrated unit so that it is not necessary for the plumber to assemble them on the job. Another advantage is that it enables the plumber during installation to avoid obstructing water pipes or other obstructions by deforming the drainpipe around such obstruction and avoids the use of tools such as pipe cutters and wrenches. It also reduces the time of and the labor cost in making such installation. Another advantage is that it reduces the possibility of leakage because of the absence of joints in its assembly. An important advantage of the present invention is in deforming the tubular wall thereof between the thumb and fingers to locate obstructions that form in the drainpipe and trap area and thereafter remove them by flushing.

Other advantages, more or less ancillary to the foregoing, will appear in the following description and the accompanying drawing of the invention.

THE DRAWING

Referring to the drawing:
FIG. 1 is a vertical sectional side view of a lavatory bowl and the novel drainpipe and trap unit and showing the drainpipe connected to the bowl discharge outlet and a vertical soil pipe shown in phantom.
FIG. 2 is a detailed vertical sectional side view of the novel drainpipe and trap connected to a horizontal soil pipe shown in phantom.

THE PREFERRED EMBODIMENTS

The lavatory bowl drainpipe and trap assembly unit is illustrated in FIG. 1 of the drawing. It will be seen that the device of the invention comprises a bowl member A, a drainpipe and trap member B, and a bowl waste water stopper unit member C.

The said bowl member A includes a bowl portion 10, an integral slab portion 11, and the usual mounting devices for floor or wall installation. The slab portion 11 is generally horizontal and positioned slightly above said bowl 10 adjacent the rear or wall side thereof and is adapted to receive the mounting of said stopper unit member C and the usual water supply pipes. The said bowl 10 has a wall 12 of generally uniform thickness with its top edge or rim 13 lying in a horizontal plane and has an integral tubular waste water outlet 14 positioned centrally of the bottom portion thereof.

The said tubular waste water outlet 14 has a flange 15 extending downwardly from the outer surface of the bowl 10 to provide a drainpipe connection with the drainpipe and trap member B. The said flange 15 preferably has a wall thickness 16, somewhat greater than the thickness of the wall 12 of the bowl 10. The bowl 10 has an overflow duct 17 imbedded in the wall 12 of the bowl 10 and in the wall 16 of the flange 15. The said duct 17 extends from adjacent the rim 13, where it has its upper opening 18 within the bowl 10, to its lower opening 19 on the bottom surface 20 of the flange 15.

The said member B as shown in FIG. 1 includes a corrosion resistant deformable plastic tubular drainpipe portion 30 and the water seal corrosion resistant deformable plastic tubular trap portion 31. The wall 32 of said drainpipe portion 30 and the wall 33 of the trap portion 31 are preferably of uniform thickness for ease of manufacture. Said walls 32 and 33 are made of such thickness so as to maintain the shape and position of member B when waste water is passing therethrough following a discharge thereof from bowl 10, as well as during the nonuse thereof.

For ease of installation, the drainpipe 30 and the trap 31 are made with a diameter to fit the standard connections with bowls such as shown on the drawing and with the standard soil pipe used for such plumbing fixtures. The diameter of the drainpipe 30 adjacent the bowl flange 15 may be enlarged somewhat at 34 to cooperate with said bowl waste water stopper unit member C.

The said tubular trap portion 31 comprises an upstanding vertical outer portion 35 and an upstanding vertical inner portion 36 spaced apart from said outer portion and in substantial axial alignment therewith to provide a water channel 37 therebetween of sufficient area to carry a full volume of water leaving the bowl 10. In order to provide such water channel 37 the said outer portion 35 preferably has an inside diameter somewhat larger than the diameter of the waste water outlet 14 of said bowl while the said inner portion 36 has an inside diameter substantially the same as said waste water outlet 14.

The said trap outer portion 35 as shown in FIG. 1 has a closed top wall 38 and a bottom wall 39 has a circular opening 40 therein in axial alignment with said top wall 38. The said circular opening 40 is of the same size as the outside diameter of said inner portion 36 and is provided with a downwardly extending flange 41.

The said trap portion 31 is assembled by inserting a section of the said inner portion 36 through the said opening 40 of the outer portion 35 so that its upper end 42 is positioned above the wall 32 of the drainpipe portion 30 to provide a waterseal in said trap when waste water is released from said bowl 10.

The said inner portion 36 also serves as a drainpipe from the trap 31 to a soil pipe to which it extends. A clamp 43 is provided on said flange 41 to seal the inner wall surface thereof and the outer wall surface of the said trap inner portion 36 and further to secure the position of said inner portion 36 in the trap 31 against slippage.

It may be desirable to make said trap portion 31 in an alternative form for use in installations where the soil pipe opening extends horizontally from the building wall as well as where it extends upward from the floor or otherwise. Such an alternative form is shown in FIG. 2 of the drawing where the trap portion 50 is adapted for such use.

In such an installation where the soil pipe extends horizontally from the building wall, it will be seen that the outer wall portion 51 of said trap portion 50 is substantially of the same form as the outer wall portion 35 of FIG. 1, except that it has a second opening 52 therein corresponding to said circular opening 40 but which is placed in a position opposite said wall 32 of the drainpipe 30 and in substantial axial alignment therewith. The said opening 52 has a flange 53 similar to said flange 41.

Where the form is used having the two openings 40 and 52, the installer may seal the opening that is not suitable for use in a particular installation with a plastic plug 54 and a clamp 55.

In the event it seems desirable to make said trap portion 50 with a single opening such as 52 for use with a horizontal soil pipe opening, the opening 40 with its flange 41 may be omitted without detriment to the functioning of the trap portion 50.

The inner trap portion 56, as shown in said FIG. 2, has an upstanding vertical section 57 and a horizontal section 58. The said inner sections 57 and 58 have a diameter substantially the same as said inner portion 36 shown in FIG. 1 and is speced apart from said outer wall portion 51 to provide a waste water channel 59 therebetween. The said horizontal section 58 extends through said opening 52 and flange 53 to the opening of the horizontal soil pipe adjacent the building wall. A clamp 60 is provided on said flange 53 to hold said inner trap portion 56 in position and to seal said flange 53 and said section 58 against waste water leakage.

The said bowl waste water stopper unit member C includes a U-shaped rod 70 for actuating said unit, a handle 71 on said rod, a friction clamp 72 for holding said rod in a desired position and a stopper 73 adapted to seal said waste water outlet 14. The said U-shaped rod 70 is positioned in a substantially vertical plane and has one long vertical arm 74 and a short vertical arm 75. The said long arm 74 extends through an aperture 76 in the slab portion 11 of the bowl 10. The handle 71 is mounted on the end of said long arm 74 above said slab portion 11 and said clamp 72 is mounted on said long arm 74 just below said aperture 76 and is affixed to said slab portion 11 adjacent thereto. The said short rod arm 75 is positioned below the forward enlarged section 34 of said drainpipe wall 32.

The said stopper 73 preferably comprises a metal disc 77 mounted on the end of said short vertical arm 75 and in axial alignment therewith and a plastic sleeve 78 mounted on said disc 77 and having its upper surface 79 slanted toward the trap 31. The said upper surface 79 of said sleeve 78 remains in contact with the drainpipe wall section 34 at all times as a support therefor and to provide proper drainage of said waste water.

The overall diameter of said stopper 73 with the sleeve 78 mounted thereon should be slightly less than the diameter of said waste water outlet 14, so that when it is used to lift said drainpipe wall section 34 into contact with said waste water outlet 14, it will slightly force said wall section 34 into the said waste water outlet 14 to provide the seal therefor. The said disc 77 may be coated with Teflon to reduce the friction between the wall section 34 and the disc while the stopper unit is being operated.

It will be seen that the amount of waste water retained in the trap 31 can be regulated as desired by raising or lowering the inner portion 36 of the trap as shown in FIG. 1 or by cutting off a part of the vertical section 57 of the inner part 56 of the trap as shown in FIG. 2.

Also it will be seen that by raising the handle 71 of the stopper unit, member C, the wall 34 of the drainpipe 30 will close the waste outlet of the bowl 10 but at the same time permit the overflow duct 17 to discharge water into the drainpipe 30 if the need should arise.

Although the foregoing description is necessarily of detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:
1. A plumbing fixture assembly of the lavoratory bowl type with a water supply therefor comprising:
   (a) a bowl having a waste water discharge outlet in the bottom wall thereof;
   (b) a solvent resistant deformable plastic waste water disposal tubular drainpipe having an upper end section connected to said waste water discharge outlet and a lower end section connected to a soil pipe;
   (c) a solvent resistant deformable plastic tubular water seal trap means in said waste water disposal drainpipe upper section and extending vertically above the upper wall thereof, the said trap means comprising a vertical tubular water receiving outer portion integral with said drainpipe upper section and a water outlet inner portion integral with the drainpipe lower section and concentric with and spaced apart from said outer portion to provide a water passage therebetween; an annular flanged drain opening in the lower wall of said outer portion to receive said inner portion and clamp means on said annular flange to adjustably position said water outlet inner portion to provide a water seal in said trap means; and
   (d) a waste water stopper actuating means mounted on said bowl adjacent the water supply and frictionally engaging and flexing upwardly the bottom wall of said drainpipe and thereby permitting the opening and closing of said waste water outlet to said bowl.

2. The plumbing fixture assembly defined in claim 1 wherein said bowl has a slab portion having an aperture in the top wall thereof and an overflow passage in the wall of said bowl, said passage having an inlet adjacent the rim of said bowl and a discharge outlet adjacent said discharge outlet of said bowl.

3. The solvent resistant deformable plastic waste water disposal tubular drainpipe defined in claim 1 wherein the diameter of said drainpipe is enlarged adjacent said bowl discharge outlet.

4. The solvent resistant deformable plastic tubular water seal trap means defined in claim 1 wherein the said vertical tubular outer portion thereof has a second annular flanged drain outlet opening in a side wall similar to said annular flanged drain outlet opening in said bottom wall thereof in substantial horizontal alignment with an inlet drain opening to provide vertical and horizontal outlet connections therefor, and a plug for sealing one of said outlet openings.

5. The solvent resistant deformable plastic tubular water seal trap means defined in claim 4 wherein said trap comprises an L-shaped tubular inner portion, said L-shaped tubular portion having an upstanding vertical upper section and a horizontal lower section, said L-shaped tubular inner portion having its vertical upper section inserted in said vertical outer portion through one of said outlet openings and spaced apart from said vertical outer portion and in concentric alignment therewith and having the end of said upper section above the said entering drainpipe opening, to provide a waste water passage therebetween 6. The plumbing fixture assembly defined in claim 2 wherein said waste water stopper actuating means comprises a vertical U-shaped actuating rod, a handle, an adjusting clamp and a disc and stopper, said U-shaped actuating rod having a long arm and a short arm, said long arm extending through said aperture in said slab portion of said bowl, said handle mounted on the end of said long arm above said slab, said adjusting clamp mounted in said aperture in slidable frictional engagement with said long arm for raising and lowering said rod, said disc horizontally mounted on the end of said short arm and in concentric alignment therewith and positioned in substantial axial alignment with said bowl waste water outlet and having its upper surface in frictional engagement with the under outer surface of said drainpipe wall whereby the corresponding inner surface of said drainpipe wall may engage the flange of said bowl waste water outlet and provide a waste water stopper seal for said bowl waste water discharge outlet when said actuating rod is raised to its closed position and may open said discharge outlet when said actuating rod is lowered to its open position.

7. The waste water stopper actuating means defined in claim 6 wherein said disc has a solvent resistant deformable plastic sleeve mounted on its periphery and bottom surface, said sleeve having its upper end slanting toward the said trap in said drainpipe and frictionally engaging said drainpipe outer surface.

8. The waste water stopper actuating means defined in claim 6 wherein said disc has its upper surface coated with a friction-reducing material.

References Cited

UNITED STATES PATENTS

| | | | |
|---|---|---|---|
| 210,334 | 11/1878 | Kinsman | 4—203 |
| 328,354 | 10/1885 | Stears | 4—204 |
| 434,689 | 8/1890 | Wade | 4—197 |
| 760,342 | 5/1904 | Metosh | 4—203 |
| 1,035,457 | 8/1912 | Madden | 4—197 |
| 1,051,393 | 1/1913 | Dunlap | 4—203 |
| 1,056,353 | 3/1913 | Moore | 4—199 |
| 1,512,919 | 10/1924 | Fraser | 4—202 |
| 1,984,950 | 12/1934 | Steen | 4—203 |
| 2,245,946 | 6/1941 | Vermere | 4—203 |
| 2,607,045 | 8/1952 | Morris | 4—199 |
| 3,307,206 | 3/1967 | Kreuger | 4—199 |

FOREIGN PATENTS

| | | |
|---|---|---|
| 984,468 | 2/1965 | Great Britain. |

LAVERNE D. GEIGER, Primary Examiner

D. B. MASSENBERG, Assistant Examiner